UNITED STATES PATENT OFFICE 1,992,020

FIREPROOF, WATERPROOFING, AND POLISHING COMPOUND

Albert J. Turner and Harvey G. Kittredge, Dayton, Ohio, assignors to The Kay & Ess Chemical Corporation, Dayton, Ohio, a corporation of Delaware No Drawing. Application August 31, 1933,
Serial No. 687,726

11 Claims. (Cl. 91—68)

Our invention relates to a new article of manufacture for use as a non-inflammable, waterproofing and polishing compound for wood, and a method of manufacturing such a compound and the method of applying it to the wood.

It is our object to provide such a waterproofing and polishing compound which will have no fire hazard and may be safely handled in the shops in connection with the application of the compound to wood and will be of such a nature that no vapors of inflammable character will come off of the compound while the wood is being treated.

It is the object of our invention to provide such a fireproof compound which, when it is applied to the wood, will not only waterproof the wood but make it capable of taking a high polish which is not affected by such materials as acetone used in connection with the making of shoes on shoe lasts.

Our invention is particularly adapted to the treating and impregnating of wood shoe lasts and wood heels to give them a high lustre finish and, at the same time, to waterproof them but without any danger of fire during the application of the materials and without the danger of rendering the wood more inflammable.

It is a further object to provide such a compound of simple and more easily handled composition than heretofore possible in the art and one in which any tendency on the part of the wood oil to jel or polymerize is prevented.

The finish provided by our invention is so smooth that the last and shoe can be parted without the necessity of chalking the last and without the necessity of heel stripping, thereby effecting a marked economy in the production of shoes; and this finish is not affected by the acetone in the cellastic backing employed in the building of shoes on wooden shoe lasts so treated.

Our product embodying our invention can be made according to the following typical formula which we have found satisfactory in practical use. We melt 22 pounds of rosin ester, which is a combination of rosin and glycerine, in 31 gallons of raw China-wood oil. This melting is carried op to 530 degrees F. We then add 112 grams of sulphur and continue the temperature up to 600 degrees F. We then add 21 pounds of rosin ester and 1 gallon of raw China-wood oil continuing this temperature for approximately 5 to 10 minutes. Thereafter, we cool the mixture to between 440 and 450 degrees F. and, when so cooled to that range of temperature, we add 108 gallons of petroleum naptha, 10 gallons of drier composed of manganese resinate dissolved in turpentine, 96 gallons of carbon tetrachloride and 160 pounds of paraffin wax.

The rosin ester and raw China-wood oil provide a waterproofing compound. The sulphur prevents the wood oil from tending to jel or polymerize. The resulting compound of the rosin ester and raw China-wood oil so treated has ability to waterproof while at the same time to penetrate the wood but not interfere with the action of the remainder of the compound in not only fireproofing the compound but also in impregnating the wood with polishing material that gives the wood the requisite finish which is not affected by acetone or similar materials. Our combination in the compound solves this problem of securing these results without having them interfered with by the various parts cooperating in the compound.

The petroleum naptha and the carbon tetrachloride act as penetrating compounds and thinners while the carbon tetrachloride prevents the rise of inflammable vapors when the product is being applied to wood so that the carbon tetrachloride has the dual function of a penetrating agent and thinner, and all form with the remaining elements a non-inflammable compound and a relatively non-inflammable product despite the application of this treatment.

It will be understood that, in the place of paraffin wax, we may employ beeswax, ceresin wax, ozokerite, japan wax, bayberry wax, candelilla, or hard pressed stearic acid, or other equivalent waxes.

The rosin ester and raw China-wood oil provide a varnish in combination with the sulphur and waxes that results in a hard, waterproof, finish, the surface of which is capable of taking repeated high polishes. The product is not only applied to the surface but penetrates the wood and impregnates it.

The carbon tetrachloride and petroleum thinners facilitate this penetration and the even flow over the surface and into the wood of the varnish and waxes. They also facilitate the air drying of the wood after it has been treated. The China wood oil facilitates the interior waterproofing of the article by reason of its penetration and the carbon tetrachloride facilitates this penetration while at the same time preventing explosions during the application and facilitating the general fireproofing of the compound. The wax resists the acetone action, facilitates the polishing of the surface in combination with the rosin ester, fills the surface pores of the wood and acts as a further waterproofing medium on the surface of the wood.

The process of applying this compound to the wood is as follows: the finished last or heel blocks, made of such woods as maple, which are extremely hard, are dipped in this compound of our invention at room temperature for approximately 20 minutes, or more. It is then drained of the surplus liquid and allowed to dry. After it has air dried for a period of from 12 to 24 hours, room temperature, depending upon current moisture and temperature conditions, it is polished resulting in a natural wood finish revealing the grain of the wood. An ordinary wood last is penetrated a considerable distance below its surface by this compound and, in many instances, is completely saturated throughout with it.

The resulting finish is extremely hard, very smooth and waterproof.

In the manufacture of shoes, the finish is such that the present practice of chalking the lasts is eliminated. The sticking of the acetone, as in the use of cellastic backing, is eliminated as the compound is impervious to acetone action. Heel stripping is also eliminated. These three factors alone constitute a very large saving in the cost of manufacturing shoes.

The proportions mentioned are not exclusive as many other different proportions can be employed, but we have found that the proportions indicated in actual practice are successful and satisfactory proportions. Naturally, such proportions are varied according to the conditions under which the compound is employed and varying conditions of temperature and humidity as well as variations in the natural product, such as the wood being treated.

We comprehend within our invention the practice of expediting the application of this material of our invention by placing the wood in a chamber subjected to a vacuum of approximately 2–4 inches and, when the air has been withdrawn from the wood, we then apply the compound so that it will cover the lasts or other wood articles; and, thereafter, we apply 50–60 pounds of pressure to force the compound into the wood so that it will thoroughly penetrate the wood. Thereafter, the lasts are drained and dried.

It will be understood that when we refer to a last we refer to any article of wood.

It will be further understood that we desire to comprehend within our invention such modifications as may be necessary to adapt it to varying conditions and uses.

Having thus fully described our invention, what we claim as new and desire to secure by Letters Patent, is:

1. A new composition for use as a waterproofing and polishing compound for wood, in combination a spar varnish comprising rosin ester, raw China wood oil and sulphur; and a non-inflammable penetrating waterproofing and polishing compound comprising petroleum naptha, a drier, carbon tetrachloride and paraffin wax.

2. A new composition for use as a waterproofing and polishing compound that is fireproof for the purpose of being applied to wood for the impregnation of the wood and imparting to it a hard smooth surface, in combination 22 pounds of rosin ester, 31 gallons of raw China wood oil, 112 grams of sulphur, 21 additional pounds of rosin ester and one additional gallon of raw China-wood oil, 108 gallons of petroleum naptha, 10 gallons of drier, 96 gallons of carbon tetrachloride and 160 pounds of paraffin wax.

3. A composition of matter for use in impregnating wood with a fireproof, waterproofing and polishing compound, comprising rosin ester and raw China wood oil melted to 530 degrees F. to which is added sulphur and after which, upon heating to 600 degrees F. additional rosin ester and raw China-wood oil are added, and thereafter, upon being cooled from 440 to 450 degrees F. is added petroleum naptha, a dried, carbon tetrachloride and a wax.

4. A composition of matter for use as a fireproof, waterproofing and polishing compound for wood, comprising 22 pounds of rosin ester and 31 gallons of raw China-wood oil melted to 530 degrees F. to which is then added 112 grams of sulphur; and after elevating the temperature thereof to 600 degrees F. there is added 21 pounds of rosin ester and 1 gallon of raw China wood oil; and thereafter, upon cooling the compound to 440 to 450 degrees F. there is added 108 gallons of petroleum naptha, 10 gallons of drier, 96 gallons of carbon tetrachloride and 160 pounds of paraffin wax.

5. A new composition for use as a waterproofing and polishing compound for wood, in combination, a spar varnish comprising resin ester, China-wood oil and sulphur; and a non-inflammable penetrating waterproofing and polishing compound comprising a thinner, a drier, and carbon tetrachloride and paraffin wax, the wax and thinner being of sufficient quantity to render the composition penetrating to wood.

6. A new composition for use as a waterproofing and polishing compound for wood, in combination, a spar varnish comprising resin ester, China-wood oil, and sulphur; and a non-inflammable penetrating waterproofing and polishing compound comprising a thinner, a drier, and fireproofing agent, the wax and thinner being of sufficient quantity to render the composition pentrating to wood.

7. A method of applying a fireproof waterproofing and polishing compound to wood comprising dipping the wood in a compound consisting of a spar varnish composed of resin ester, China-wood oil and sulphur, and a non-inflammable penetrating waterproofing and polishing compound including a thinner, a drier, a paraffin wax, and a fireproofing agent, the wax and thinner being of sufficient quantity to render the composition penetrating to wood, and removing the wood so treated and drying it.

8. A method of applying a fireproof waterproofing and polishing compound to wood comprising extracting air from the wood, dipping the wood while the air is extracted in a compound consisting of a spar varnish composed of resin ester, China-wood oil and sulphur, and a non-inflammable penetrating waterproofing and polishing compound including a thinner, a drier, a paraffin wax, the wax and thinner being of sufficient quantity to render the composition penetrating to wood, and removing the wood so treated and drying it.

9. A method of applying a fireproof waterproofing and polishing compound to wood comprising dipping the wood in a compound consisting of a spar varnish composed of resin ester, China-wood oil and sulphur, and a non-inflammable penetrating waterproofing and polishing compound including a thinner, a drier, a paraffin wax, the wax and thinner being of sufficient quantity to render the composition penetrating to wood, and removing the wood so treated and drying it.

10. A method of applying a fireproof waterproofing and polishing compound to wood comprising dipping the wood in a compound consisting of a spar varnish composed of resin ester, China-wood oil and sulphur, and a non-inflammable penetrating waterproofing and polishing compound including a thinner, a drier, a paraffin wax, and a fireproofing agent, the wax and thinner being of sufficient quantity to render the composition penetrating to wood, applying pressure to the compound, and subsequently removing the wood so treated and drying it.

11. A method of applying a fireproof waterproofing and polishing compound to wood, comprising extracting air from the wood, then dipping it while the air is extracted in a compound including a spar varnish composed of resin ester, China-wood oil, and sulphur; and a non-inflammable penetrating waterproofing and polishing compound including a thinner, a drier, a paraffin wax, and applying pressure to the compound to force the same so as to impregnate the wood with the compound, removing the wood so treated and drying it.

ALBERT J. TURNER.
HARVEY G. KITTREDGE.